(12) United States Patent
Staebler et al.

(10) Patent No.: US 10,734,927 B2
(45) Date of Patent: Aug. 4, 2020

(54) MOTOR DRIVE PHASE SECTOR BUFFER, OFFSET AND GAIN ERROR CIRCUITRY

(71) Applicant: TEXAS INSTRUMENTS INCORPORATED, Dallas, TX (US)

(72) Inventors: Martin Staebler, Freising (DE); Ferdinand von Molo, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/544,249

(22) Filed: Aug. 19, 2019

(65) Prior Publication Data

US 2019/0372488 A1 Dec. 5, 2019

Related U.S. Application Data

(62) Division of application No. 15/299,063, filed on Oct. 20, 2016, now Pat. No. 10,389,281.

(51) Int. Cl.
*H02P 7/00* (2016.01)
*H02P 6/16* (2016.01)
(Continued)

(52) U.S. Cl.
CPC .............. *H02P 6/16* (2013.01); *G01D 5/2448* (2013.01); *G01D 18/002* (2013.01); *H02P 2203/03* (2013.01)

(58) Field of Classification Search
CPC ..... H02P 6/16; H02P 2203/03; G01D 18/002; G01D 5/2448
(Continued)

(56) References Cited

U.S. PATENT DOCUMENTS 5,867,166 A * 2/1999 Myhrvold ............. G06T 11/001
 345/419
5,886,701 A * 3/1999 Chauvin ................. G06T 11/40
 345/418
(Continued)

FOREIGN PATENT DOCUMENTS

EP 2955823 A1 12/2015
GB 2496236 A 5/2013

OTHER PUBLICATIONS

European Search Report dated Sep. 26, 2019.

*Primary Examiner* — Eduardo Colon Santana
*Assistant Examiner* — Gabriel Agared
(74) *Attorney, Agent, or Firm* — Lawrence J. Bassuk; Charles A. Brill; Frank D. Cimino

(57) ABSTRACT

A sort buffer includes a phase sector determination circuit, a phase sector update circuit, and a phase sector completion circuit. The phase sector determination circuit is configured to determine a phase sector corresponding to a phase of a first sine and cosine sample pair received from an encoder or resolver. The phase sector update circuit is configured to determine whether a second sine and cosine sample pair corresponding to the phase sector is stored in a lookup table (LUT) and, in response to a determination that a second sine and cosine sample pair corresponding to the phase sector is not stored in the LUT, store the first sine and cosine sample pair in the LUT. The phase sector completion circuit is configured to determine whether the LUT has stored, for each of a plurality of phase sectors, a corresponding sine and cosine sample pair.

20 Claims, 3 Drawing Sheets

(51) Int. Cl.
 *G01D 5/244* (2006.01)
 *G01D 18/00* (2006.01)
(58) Field of Classification Search
 USPC .......................................................... 318/466
 See application file for complete search history.

(56) References Cited

U.S. PATENT DOCUMENTS

| | | | |
|---|---|---|---|
| 5,956,659 A | 9/1999 | Spies | |
| 6,556,153 B1* | 4/2003 | Cardamone | G01D 5/24404 341/111 |
| 7,251,144 B2 | 7/2007 | Chu | |
| 10,320,594 B2* | 6/2019 | Poley | H04L 25/4902 |
| 2003/0122018 A1 | 6/2003 | Persson | |
| 2005/0067986 A1* | 3/2005 | Kurosawa | G11B 19/28 318/400.35 |
| 2008/0106229 A1* | 5/2008 | Kosaka | G01D 5/2073 318/661 |
| 2009/0252206 A1* | 10/2009 | Rheinfelder | H03D 3/007 375/219 |
| 2012/0217912 A1 | 8/2012 | Wu | |
| 2013/0188867 A1 | 7/2013 | Sato | |
| 2015/0048242 A1* | 2/2015 | Remillard | G01D 5/2448 250/231.14 |
| 2015/0195523 A1 | 7/2015 | Sato | |
| 2015/0229932 A1* | 8/2015 | Sato | H04N 19/187 375/240.12 |
| 2018/0215409 A1* | 8/2018 | Pramod | B62D 5/049 |

\* cited by examiner

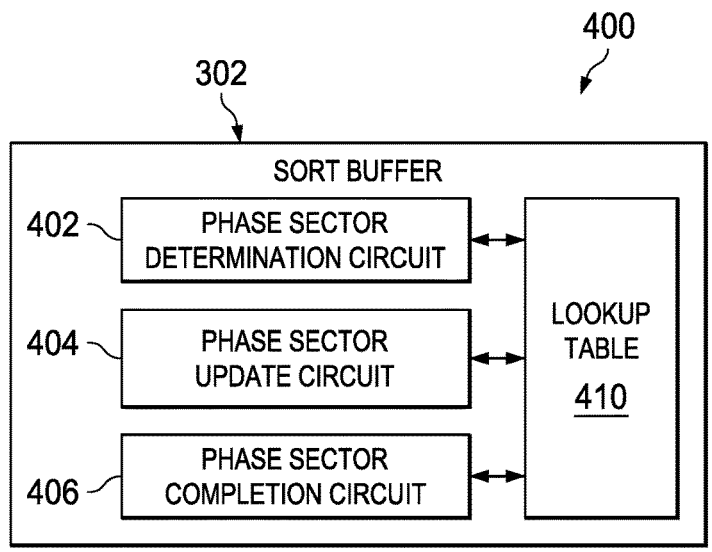
FIG. 4
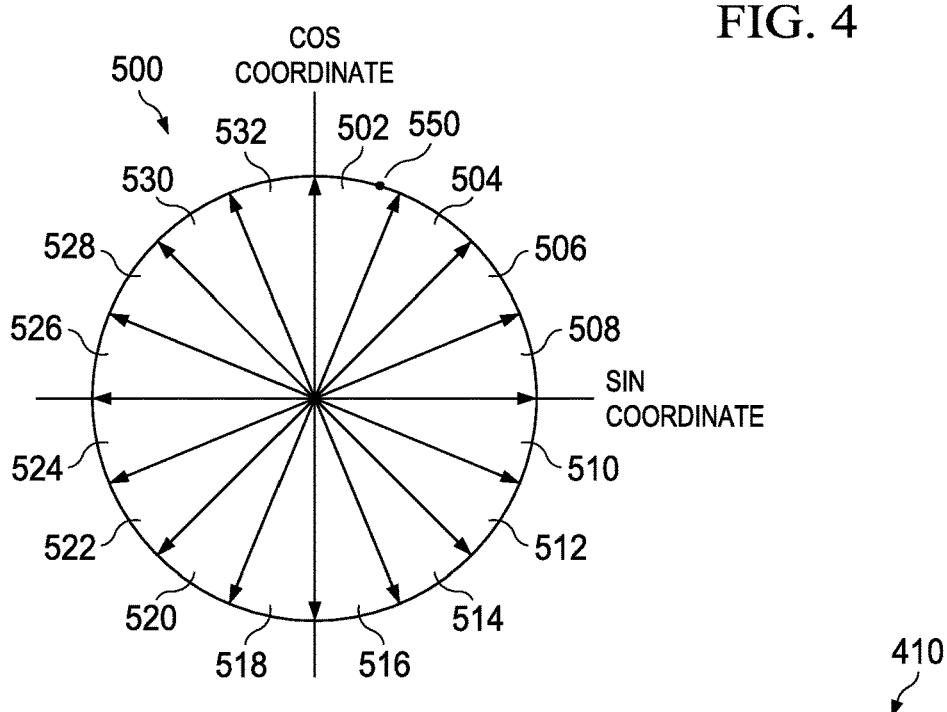
FIG. 5
FIG. 6

US 10,734,927 B2

MOTOR DRIVE PHASE SECTOR BUFFER, OFFSET AND GAIN ERROR CIRCUITRY

This application is a divisional of prior application Ser. No. 15/299,063, filed Oct. 20, 2016, now U.S. Pat. No. 10,389,281, issued Aug. 20, 2019.

BACKGROUND

Position detectors, such as encoders and resolvers, may be utilized to determine the angular position of an electric motor. Sine and cosine incremental angle encoders and/or resolvers encode the angular position of the motor into two quadrature modulated sine and cosine signals. The number of sinusoidal periods per revolution depends on the encoder line count and is typically in the range of 50 to 5000 for an encoder and one period per revolution for a resolver. Sine and cosine incremental encoders and/or resolvers allow high-resolution angle determination due to interpolation. More particularly, the high-resolution angle is typically calculated using the arctangent of the ratio between the sine signal and the cosine signal.

SUMMARY

The problems noted above are solved in large part by systems and methods of compensating for offset and gain error in an encoder or resolver. In some embodiments, an electronic device includes a sort buffer, an offset and gain error determination circuit, and a closed loop control circuit. The sort buffer is configured to receive a first sine and cosine sample pair from an encoder or resolver. The sort buffer includes a phase sector determination circuit, a phase sector update circuit, and a phase sector completion circuit. The phase sector determination circuit is configured to determine a phase sector corresponding to a phase of the first sine and cosine sample pair. The phase sector is included in a plurality of phase sectors. The phase sector update circuit is configured to determine whether a second sine and cosine sample pair corresponding to the phase sector is stored in a lookup table (LUT) and, in response to a determination that a second sine and cosine sample pair corresponding to the phase sector is not stored in the LUT, store the first sine and cosine sample pair in the LUT. The phase sector completion circuit is configured to determine whether the LUT has stored, for each of the plurality of phase sectors, a corresponding sine and cosine sample pair. The offset and gain error determination circuit is configured to determine a sine and cosine gain and offset error. The closed loop control circuit is configured to determine a sine and cosine gain and offset correction value based on the sine and cosine gain and offset error.

Another illustrative embodiment is a sort buffer that includes a phase sector determination circuit, a phase sector update circuit, and a phase sector completion circuit. The phase sector determination circuit is configured to determine a phase sector corresponding to a phase of a first sine and cosine sample pair received from an encoder or resolver. The phase sector is included in a plurality of phase sectors. The phase sector update circuit is configured to determine whether a second sine and cosine sample pair corresponding to the phase sector is stored in a lookup table (LUT) and, in response to a determination that a second sine and cosine sample pair corresponding to the phase sector is not stored in the LUT, store the first sine and cosine sample pair in the LUT. The phase sector completion circuit is configured to determine whether the LUT has stored, for each of the plurality of phase sectors, a corresponding sine and cosine sample pair.

Yet another illustrative embodiment is a method of compensating for offset and gain error in an encoder or resolver. The method includes receiving a first sine and cosine sample pair from an encoder or resolver. The method also includes determining a phase sector corresponding to a phase of the first sine and cosine sample pair. The phase sector is included in a plurality of phase sectors. The method also includes determining whether a second sine and cosine sample pair received from the encoder or resolver corresponding to the phase sector is stored in a lookup table (LUT). The method also includes, in response to a determination that a second sine and cosine sample pair corresponding to the phase sector is not stored in the LUT, storing the first sine and cosine sample pair in the LUT.

BRIEF DESCRIPTION OF THE DRAWINGS

For a detailed description of various examples, reference will now be made to the accompanying drawings in which:

FIG. 4 shows an illustrative block diagram of a sort buffer of a host processor in an electric motor system in accordance with various embodiments;

FIG. 5 shows an illustrative graph of phase sectors corresponding to phases of a sine and cosine sample pair in accordance with various embodiments;

FIG. 6 shows an illustrative lookup table for storing sine and cosine sample pair data in accordance with various embodiments.

NOTATION AND NOMENCLATURE

Figure 1:
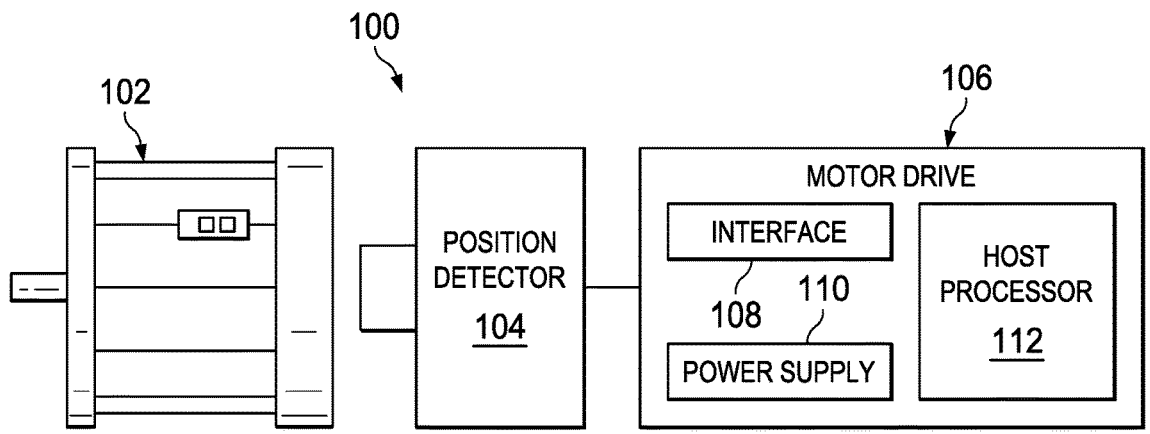
FIG. 1 shows an illustrative block diagram of an electric motor system in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Position detectors, such as encoders and resolvers, may be utilized to determine the angular position of an electric motor. Sine and cosine incremental angle encoders and/or resolvers encode the angular position of the motor into two quadrature modulated sine and cosine signals. The number of sinusoidal periods per revolution depends on the encoder line count and is typically in the range of 50 to 5000. Sine and cosine incremental encoders and/or resolvers allow high-resolution angle determination due to interpolation. More particularly, the high-resolution angle is typically calculated using the arctangent of the ratio between the sine signal and the cosine signal. Any offset or gain error (static and/or dynamic) within the signal chain for the sine and cosine signals introduces an error to the original signals. Hence, any offset and/or gain error introduces an error in the calculated angle.

One way to correct for any offset or gain error is to use hardware with high accuracy, such as resistors with 0.1% accuracy or to match resistors with ultra-low gain error and drift, low offset drift differential amplifiers, and/or sophisticated analog to digital converters (ADCs). However, utilizing expensive hardware may increase the cost of the circuit by, in some cases, multiple thousand percent. Therefore, there is a need for a low cost solution for compensating for offset or gain error in sine and cosine signals received from a electric motor position detector.

FIG. 1 shows an illustrative block diagram of an electric motor system 100 in accordance with various embodiments. The electric motor system 100 may include an electric motor 102, a position detector 104, and a motor drive 106. Electric motor 102, which may be any type of electrical motor, is configured to convert electrical energy into mechanical energy. For example, the electric motor 102 may be a brushed direct current (DC) motor, a brushless DC motor, a switched reluctance motor, an induction motor, a servomotor, and/or any type of AC or DC motor. The motor may receive power from the motor drive 106 and convert that energy into rotating a shaft. The position detector 104 is coupled to the motor 102 and is configured to generate signals that are used to determine angular or linear position and speed of the motor 102. In some embodiments, the position detector 104 is an incremental rotary encoder, and more particularly a sine and cosine encoder (sometimes referred to as a sine wave encoder). In alternative embodiments, the position detector may be a resolver. As the position detector 104 rotates, cyclical outputs are provided. These outputs may be optical, magnetic, and/or mechanical. In some embodiments, three outputs are provided by the position detector 104, one output taking the form of a sine wave, one output taking the form of a cosine wave (i.e., 90 degrees out of phase of the sine wave), and a reference output that occurs once every turn of the position detector 104.

Motor drive 106 is configured to drive motor 102. More particularly, motor 106 may receive power from motor drive 106, which may be connected to an external and/or internal power supply 110. In other words, motor drive 106 is configured to control the operation of motor 102. In addition to the power supply 110, motor drive 106 may include interface 108 and host processor 112. The interface 108 is configured to receive the output signals provided by the position detector 104 (e.g., the sine, cosine, and reference signals) and provide those signals to host processor 112.

Host processor 112 is configured to determine the angular or linear position and speed of the motor 102 based on the output signals provided by the position detector 104. Host processor 112 may be any hardware that carries out computer instructions by performing, for example, arithmetic, logical, and input/output (I/O) operations. Host processor 112 may include a central processing unit (CPU), a semiconductor-based microprocessor, a graphics processing unit (GPU), other hardware devices suitable for retrieval and execution of instructions that may be stored in memory. Additionally, host processor 112 may include a single processor, multiple processors, a single computer, a network of computers, or any other type of processing device. For example, host processor 112 may include multiple cores on a chip, multiple cores across multiple chips, multiple cores across multiple devices, or combinations thereof. Host processor 112 may include at least one integrated circuit (IC), other control logic, other electronic circuits, or combinations thereof that include a number of electronic components.

Due to certain circuitry characteristics in the motor drive 106, the position detector 104, and/or the interface 108 (e.g., mismatched resistors or amplifier offset), the output signals provided by the position detector 104 and/or the interface 108 may include gain and/or offset errors which may lead the host processor 112 to incorrectly determine the angular position of the motor 102. Therefore, the host processor 112 may be configured to determine a gain and offset correction value based on host processor 112 determined gain and offset error value of the sine and cosine signals received from the position detector 104 and/or the interface 108. The gain and offset correction value may then be applied to the initially determined angular position of the motor 102 to determine the actual angular position of the motor 102.

While shown in FIG. 1 as being a part of motor drive 106, in some embodiments, the host processor 112 is a part of position detector 104. Additionally, in some embodiments, in addition to or instead of host processor 112, a field-programmable gate array (FPGA), an application-specific integrated circuit (ASIC), and/or other hardware may be utilized to determine the gain and offset correction value of the output signals of the position detector 104.

Figure 2:
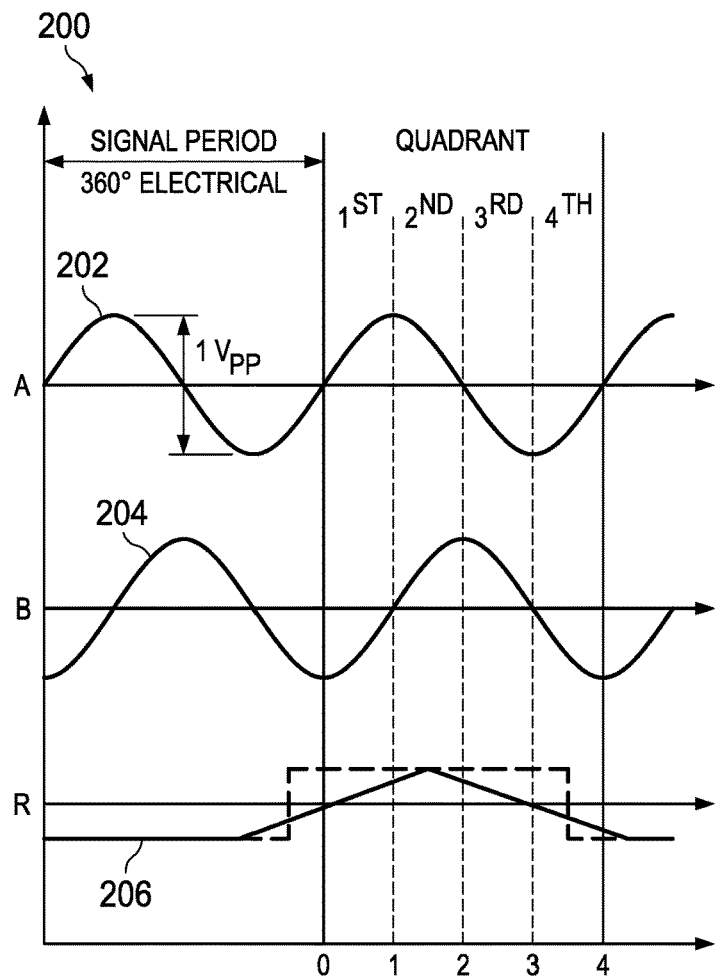
FIG. 2 shows an illustrative sine and cosine pair of signals generated by a position detector of an electric motor in accordance with various embodiments.

FIG. 2 shows an illustrative sine signal 202, cosine signal 204, and reference signal 206 generated by position detector 104 of electric motor 102 in accordance with various embodiments. As discussed above, the position detector 104 may generate analog output signals to measure angular or linear position and speed of motor 102. In some embodiments, the sine signal 202 and the cosine signal 204 are 1 Vpp or 11 uApp signals that make up a sine and cosine sample pair. In some embodiments, a position detector 104 with a 1 Vpp interface may output differential analog output signals A (A+, A−) (signal A representing a differential pair of signals A+ minus A−, shown as sine signal 202) and B (B+, B−) (signal B representing a differential pair of signals B+ minus B−, shown as cosine signal 204) with, in some embodiments, 1 Vpp and a 2.5V DC-offset. The position detector 104 may also generate a differential reference signal R (R+, R−) (signal R representing a differential pair of signals R+ minus R−, shown as reference signal 206). The reference signal 206 may have a slightly lower amplitude, and the peak may occur only once per revolution of the position detector 104.

The frequency of the sine signal 202 and cosine signal 204 generated by position detector 104 depends on the line count of the position detector 104 as well as its mechanical speed as shown by:

$$f_{A,B}[\text{Hz}] = N \cdot v[\text{rpm}] \cdot \tfrac{1}{60} \quad (1)$$

where N represents the position detector 104 line count and v represents the mechanical speed in rotations per minute (RPM) of the position detector 104.

Figure 3:
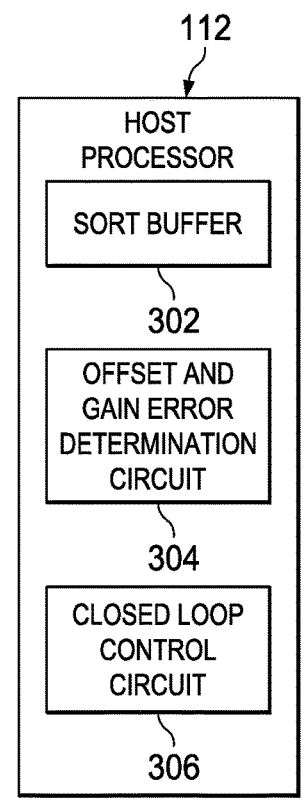
FIG. 3 shows an illustrative block diagram of a host processor of an electric motor system in accordance with various embodiments.

FIG. 3 shows an illustrative block diagram of host processor 112 of electric motor system 100 in accordance with various embodiments. Host processor 112 may include a sort buffer 302, an offset and gain error determination circuit 304, and a closed loop control circuit 306. As discussed above, in some embodiments, the sort buffer 302, an offset and gain error determination circuit 304, and a closed loop control circuit 306 may be implemented in a FPGA, an ASIC, and/or other hardware instead of or in addition to the host processor 112 shown in FIG. 3. The sort buffer 302 is configured to receive sine and cosine sample pairs from the position detector 104 and to ensure a proper distribution of sine and cosine sample pairs over one 360 degree phase period, with a sample pair in each of a plurality of phase sectors in order for the offset and gain error determination circuit 304 to determine the offset and gain error of the samples being received from the position detector 104. For example, FIG. 4 shows an illustrative block diagram 400 of sort buffer 302 in an electric motor system in accordance with various embodiments. The sort buffer 302 may include a phase sector determination circuit 402, a phase sector update circuit 404, a phase sector completion circuit 406, and a lookup table (LUT) 410. The phase sector determination circuit 402 is configured to determine a phase sector corresponding to a phase of each of a plurality of sine and cosine sample pairs. In other words, the phase sector determination circuit 402 is configured to calculate a phase for each of numerous sine and cosine sample pairs and determine which of a plurality of phase sectors that phase corresponds.

For example, FIG. 5 shows an illustrative graph 500 of phase sectors 502-532 corresponding to phases of a sine and cosine sample pair in accordance with various embodiments. In the example shown in FIG. 5, 16 phase sectors 502-532 that evenly divide over one 360 degree phase period are shown; however, in other embodiments, the number of phase sectors over one 360 degree phase period may be any power of 2 number (e.g., 2, 4, 8, 16, 32, 64, 128, 256, etc.). Thus, in the example shown in FIG. 5, each phase sector is evenly divided into 22.5 degree sectors (e.g., phase sector 502 includes phases 0 degrees to 22.5 degrees while phase sector 504 includes phases from 22.5 degrees to 45 degrees, etc.). In order to determine the phase sector of a given sine and cosine sample pair, the phase sector determination circuit 402 may determine (e.g., calculate) the phase of the sine and cosine sample pair by:

$$\varphi_{A,B} = \arctan 2(A, B) \quad (2)$$

where A represents a sample from the differential pair of signals A+ minus A−, shown as sine signal 202 from FIG. 2 and B represents a sample from the differential pair of signals B+ minus B−, shown as cosine signal 204 from FIG. 2. Once the phase is determined, the phase sector determination circuit 402 may determine which phase sector the determined phase corresponds. Thus, if, for example, the phase of a particular sine and cosine sample pair is 18 degrees, as shown for the sine and cosine sample pair 550, and there are 16 phase sectors, as shown in the example of FIG. 5, then, the phase sector determination circuit 402 determines that sine and cosine sample pair 550 corresponds with phase sector 502.

Returning to FIG. 4, phase sector update circuit 404 may be configured to determine whether the phase sector for a particular sine and cosine sample pair determined by the phase sector determination circuit 402 has a sine and cosine sample pair stored. For example, FIG. 6 shows an illustrative LUT 410 for storing sine and cosine sample pair data in accordance with various embodiments. The LUT 410 may include four columns (i.e., a phase sector column, a sine sample column, a cosine sample column, and a flag column). The LUT 410 may also include a number of rows equal to the number of phase sectors. Thus, in this example, there may be 16 rows for the phase sectors 502-532. If there are 256 phase sectors, then there would be 256 rows (one per phase sector).

In some embodiments, to identify the memory address of the LUT 410, once the phase is determined (utilizing equation 2), the phase may be scaled to the number of phase sectors (e.g., 256). For example, the phase sector determination circuit 402 may determine a phase from between 0 to 360 degrees, where 0 equals 0 and 360 degrees equals an integer representation of $2^{28}$. Utilizing 32-bit signed fractional notation, this equates to I4Q28, with 28 binary fractional bits. To identify the phase sector (e.g., 0-255 when 256 phase sectors are utilized), the phase value is right shifted by 20-bits. A right shift by 20 yields a number scaled to the number of phase sectors ($2^8$), hence the value is from 0-255. This value may be utilized as an address pointer offset to identify the phase sector index address in LUT 410.

Once a phase sector is determined by the phase sector determination circuit 402, the phase sector update circuit 404 may analyze the flag column of the LUT 410 corresponding to the phase sector determined by the phase sector determination circuit 402. Thus, for example, if the phase sector determination circuit 402 determines that a sine and cosine sample pair is in phase sector 502, the phase sector update circuit 404 may analyze the flag column in the phase sector 502 row. If a sample is already stored in the sine and cosine columns of the LUT 410 for phase sector 502, a flag will already be set. In some examples, a flag is set by setting the flag column in the row for phase sector 502 to 1. In alternative embodiments, the flag may be set to 0 when a sine and cosine sample is stored for a particular row. If the phase sector update circuit 404 determines that a flag is set for the determined phase sector, the phase sector update circuit 404 is configured to ignore the determine sine and cosine sample pair. In other words, if the phase sector update circuit 404 determines that a flag is set for the determined phase sector, the phase sector update circuit 404 is configured to do nothing (i.e., not store) the cosine and sine sample pair as a cosine and sine sample pair are already stored for the determined phase sector in the LUT 410. The phase sector determination circuit 402 is then configured to determine a phase sector for the next sine and cosine sample pair received from the position detector 104, and the process repeats. In the example shown in FIG. 6, because a sample is stored for the phase sector 502, a flag is set for the row corresponding to phase sector 502. If the phase sector determination circuit 402 determines the phase of a sine and cosine sample pair corresponds with phase sector 502, then the phase sector update circuit 404 will not store that sine and cosine sample pair because a sample is already stored for that phase sector.

However, if the phase sector update circuit 404 determines that a flag is not set for the determined phase sector (e.g., the flag is set to 0 for a given phase sector), the phase sector update circuit 404 is configured to store the sine and cosine sample pair in the LUT 410 in the row corresponding with the determined phase sector. Once the sine and cosine sample pair is stored in the LUT 410, the phase sector update circuit 404 may be configured to set the flag corresponding to the row of the determined phase sector. In the example shown in FIG. 6, a sample is not stored in the LUT 410 for phase sector 504. If the phase sector determination circuit 402 determines that a sine and cosine sample pair has a phase that corresponds with phase sector 504, the phase sector update circuit 404 determines that a flag is not set for the row corresponding with phase sector 504. Therefore, the phase sector update circuit 404 stores (i.e., writes) the sine and cosine sample pair into the LUT 410 for the row corresponding with phase sector 504. The phase sector update circuit 404 then may set the flag (e.g., set the flag to 1) for the row corresponding with phase sector 504.

The phase sector completion circuit 406 may be configured to determine whether LUT 410 has stored a sine and cosine sample pair for each of the phase sectors. For example, the phase sector completion circuit 406 may be configured to determine whether a flag is set for each row of the LUT 410. In some embodiments, a counter may be utilized to determine whether a flag is set for each row of the LUT 410. For example, as the phase sector update circuit 404 writes a sine and cosine sample pair into LUT 410 and sets the corresponding flag, the counter may increment by 1. Therefore, if there are 16 rows in LUT 410 (because there are 16 phase sectors), once the counter reaches 16, the phase sector completion circuit 406 determines that LUT 410 has stored a sine and cosine sample pair for each of the phase sectors. In alternative embodiments, the counter may start at the number of phase sectors (e.g., 16) and decrease by 1 as the phase sector update circuit 404 writes a sine and cosine sample pair into LUT 410 and sets the correspond flag. The phase sector completion circuit 406 will then determine that LUT 410 has stored a sine and cosine sample pair for each of the phase sectors once the counter reaches 0.

Returning to FIG. 3, once the phase sector completion circuit 406 determines that the LUT 410 has stored a sine and cosine sample pair for each of the phase sectors, the offset and gain error determination circuit 304 is configured to determine a sort buffer sine and cosine gain and offset error over the number of samples stored in the LUT (e.g., 16). The offset and gain error determination circuit 304 then may clear the LUT 410 of data (e.g., delete all of the samples, set all flags stored in the LUT 410 to 0, and reset the counter) and repeat the process of accumulating samples in the LUT 410 until a sine and cosine sample pair for each of the phase sectors is stored and determining a sort buffer sine and cosine gain and offset error over the number of samples stored in the LUT a predetermined number of times. For example, the offset and gain error determination circuit 304 may generate 16 different sort buffer sine and cosine gain and offset errors. Once the predetermined number of sort buffer sine and cosine gain and offset errors are determined, the offset and gain error determination circuit 304 may generate the actual sine and cosine offset and gain error by averaging the sort buffer sine and cosine gain and offset errors. This increases the numeric resolution and reduces noise compared to utilizing a single sort buffer sine and cosine gain and offset error as the actual sine and cosine gain and offset error. However, in alternative embodiments, a single sort buffer sine and cosine gain and offset error may be utilized as the actual sine and cosine gain and offset error.

In some embodiments, the offset and gain error determination circuit 304 may average the sort buffer sine and cosine gain and offset errors by adding the errors and dividing by the number of errors. However, in alternative embodiments, the offset and gain error determination circuit 304 does not divide the errors. For example, the sort buffer sine and cosine gain and offset errors may be accumulated (e.g., 16 sort buffer sine and cosine gain and offset errors). The offset and gain error determination circuit 304 then may shift bits to the right. For example, shifting 4 bits right is equivalent to a division by 16. Thus, if 16 sort buffer sine and cosine gain and offset errors are accumulated, then the offset and gain error determination circuit 304 shifts the resulting accumulation right by 4 bits to determine the actual sine and cosine gain and offset error.

The closed loop control circuit 306 may be configured to determine the sine and cosine gain and offset correction value based on the actual sine and cosine gain and offset error. In some embodiments, the actual sine and cosine gain and offset error is multiplied with a constant, KI (e.g., 0.8) and added to any previous correction value to generate the sine and cosine gain and offset correction value. The constant provides a more stable offset correction value than utilizing the actual sine and cosine gain and offset error alone, although in some embodiments, the actual sine and cosine gain and offset error may be added to any previous correction value to generate the sine and cosine gain and offset correction value. The correction value then may be used to compensate any new incoming sine and cosine samples by adding the offset and multiplying with the correction gain until the next iteration (i.e., until a new sine and cosine gain and offset correction value is calculated). This whole process (i.e., determining an actual sine and cosine gain and offset error and a sine and cosine gain and offset correction value) may be repeated, ensuring that the gain and offset error converges toward 0.

Figure 7:
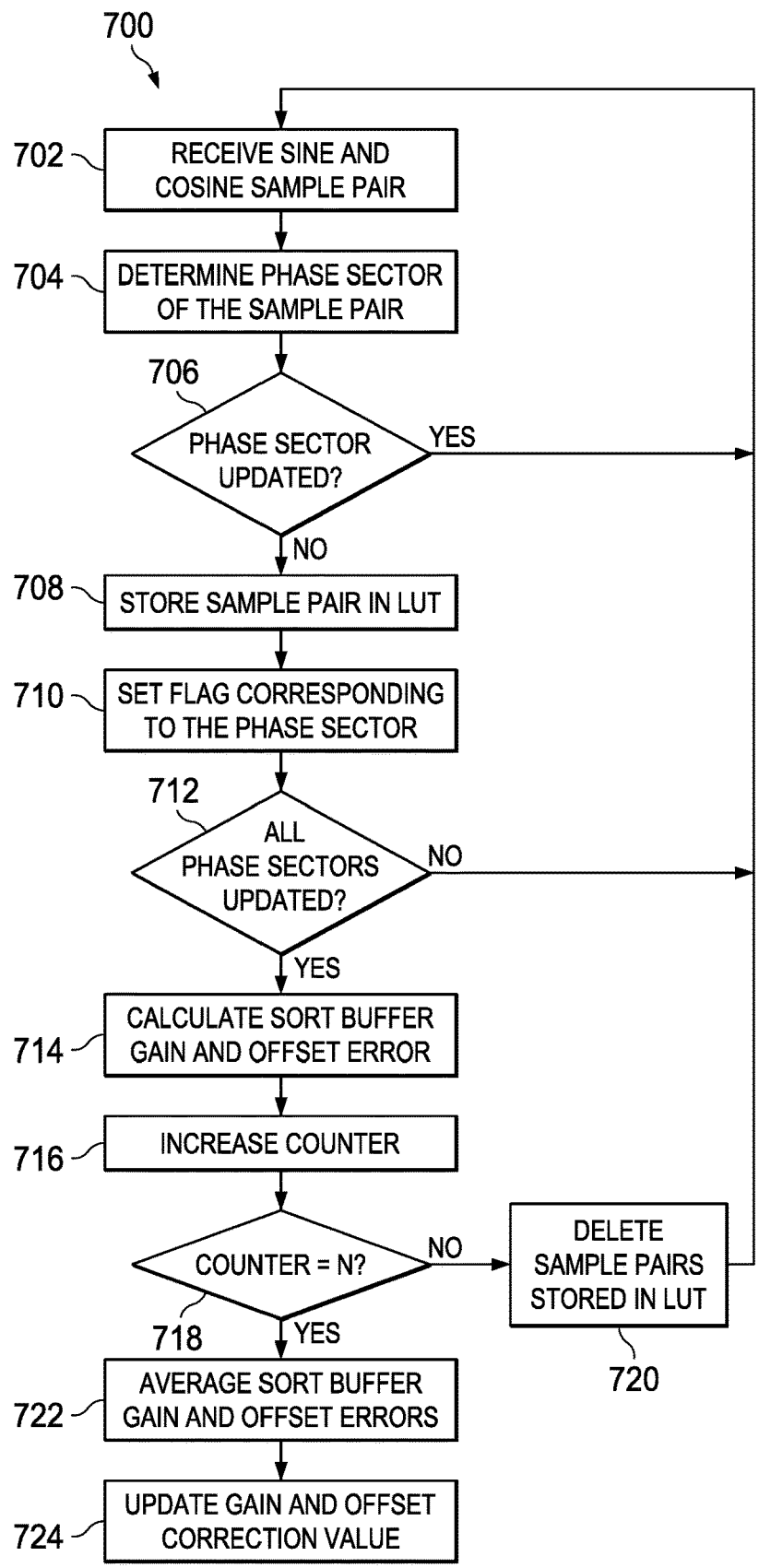
FIG. 7 shows an illustrative flow diagram of a method of compensating for offset and gain error in an encoder or resolver of an electric motor system in accordance with various embodiments.

FIG. 7 shows an illustrative flow diagram of a method 700 for compensating for offset and gain error in an encoder or resolver of an electric motor system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 700, as well as other operations described herein, can be performed by the sort buffer 302 (including the phase sector determination circuit 402, phase sector update circuit 404, and/or phase sector completion circuit 406), the offset and gain error determination circuit 304, and/or closed loop control circuit 306 and implemented in logic and/or by a processor executing instructions stored in a non-transitory computer readable storage medium.

The method 700 begins in block 702 with receiving a sine and cosine sample pair. For example, the sort buffer 302, and more particularly the phase sector determination circuit 402, may receive a sine and cosine sample pair from a position detector, such as position detector 104. In block 704, the method 700 continues with determining the phase sector of the received sine and cosine sample pair. For example, the phase sector determination circuit 402 may determine (i.e., calculate) the phase of the sine and cosine sample pair, and, based on the determined phase, determine which phase sector of a plurality of phase sectors the phase corresponds.

The method 700 continues in block 706 with determining whether the determined phase sector is updated in the LUT. For example, the phase sector update circuit 404 may determine whether a second sine and cosine sample pair received from the position detector corresponding to the phase sector determined by the phase sector update circuit is already stored in the LUT. If a sine and cosine sample pair is already stored in the LUT for the determined phase sector, then the phase sector is already updated in the LUT. However, if a sine and cosine sample is not stored in the LUT for the given phase sector, then the phase sector is not updated in the LUT.

If, in block 706, a determination is made that the phase sector is updated in the LUT, then the sine and cosine sample is ignored and the method 700 continues in block 702 with receiving another sine and cosine sample pair from the position detector. However, if, in block 706, a determination is made that the phase sector is not updated in the LUT, then the method 700 continues in block 708 with storing (i.e., writing) the sine and cosine sample pair in the LUT. In block 710, the method 700 continues with setting a flag in the LUT corresponding to the phase sector. For example, once the sine and cosine sample pair are stored in the LUT, a flag field corresponding to the phase sector may be set to 1.

The method 700 continues in block 712 with determining whether all of the phase sectors in the LUT are updated. For example, the phase sector completion circuit 406 may determine whether all phase sectors in the LUT are updated utilizing a counter. As a sine and cosine sample pair is stored in the LUT, the counter may be incremented by 1. If there are 16 phase sectors, once the counter reaches 16, the phase sector completion circuit 406 may determine that all phase sectors in the LUT are updated.

If, in block 712, a determination is made that all phase sectors in the LUT are not updated, the method 700 continues in block 702 with receiving another sine and cosine sample pair from the position detector. However, if, in block 712, a determination is made that all phase sectors in the LUT are updated, then the method 700 continues in block 714 with calculating, in some embodiments utilizing offset and gain error determination circuit 304, a sort buffer gain and offset error over the corresponding samples stored in the LUT. In block 716, the method 700 continues with increasing a sort buffer error gain and offset error counter. For example, every time a sort buffer gain and offset error is calculated, a counter may be incremented by 1.

The method 700 continues in block 718 with determining whether the sort buffer error gain and offset error counter equals a predefined number N. For example, if the predefined number is 16, then a determination is made, in some embodiments by the offset and gain error determination circuit 304, whether the sort buffer error gain and offset error counter equals 16.

If, in block 718, a determination is made that the sort buffer error gain and offset error counter does not equal the predefined number N, the method 700 continues in block 720 with deleting the sine and cosine sample pairs stored in the LUT and resetting all of the flags. In block 702, the method 700 continues with receiving another sine and cosine sample pair from the position detector. However, if, in block 718, a determination is made that the sort buffer error gain and offset error counter equals the predefined number N, then the method 700 continues in block 722 with averaging, in some embodiments utilizing offset and gain error determination circuit 304, the sort buffer gain and offset errors to generate an actual gain and offset error.

The method 700 continues in block 724 with updating, in some embodiments utilizing the phase sector completion circuit 406, the gain and offset correction value. For example, the actual sine and cosine gain and offset error may be multiplied with a constant and added to any previous compensation value to generate the gain and offset correction value. The correction value then may be used to compensate any new incoming sine and cosine samples by adding the offset and multiplying with the correction gain until the next iteration (i.e., until a new sine and cosine gain and offset correction value is calculated).

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A system comprising:
a motor having a drive input;
a position detector coupled to the motor and having a sine output and a cosine output; and
a motor drive unit having a drive output coupled to the motor and having a sine input coupled to the sine output and a cosine input coupled to the cosine output, the motor drive unit including a processor and the processor including:
a sort buffer having inputs coupled to the sine input and to the cosine input and having phase sector locations for a phase period, the phase sector locations for storing a sine sample value and a cosine sample value in each phase sector location;
offset and gain error determination circuitry coupled to the sort buffer and having an offset and gain error output, the offset and gain error determination circuitry determining sine and cosine offset and gain errors based on sine and cosine sample pairs in the sort buffer; and
control circuitry having an input coupled to the offset and gain error output, and having an output coupled to the drive output to drive the motor in response to the offset and gain correction value output.

2. The system of claim 1, in which each phase sector location includes a sine sample value location, a cosine sample value location, and a flag location.

3. The system of claim 2, in which the gain and offset error determination circuitry has an input coupled to the flag locations and the gain and offset error determination circuitry providing an error signal on the offset and gain error output in response to a determination that the sort buffer has sine and cosine sample pairs stored in every phase sector location.

4. The system of claim 3, in which the gain and offset error determination circuitry provides an error signal on the offset and gain error output by determining an individual sine and cosine offset and gain error for each sine and cosine sample pair stored in the sort buffer, and averaging the individual sine and cosine gain and offset errors to determine a sine and cosine gain and offset error.

5. The system of claim 2, in which the sort buffer includes a look up table.

6. The system of claim 2, in which a number of phase sectors is a power of two and the phase sectors are of equal size.

7. The system of claim 6, in which the phase period is 360 degrees.

8. The system of claim 6, in which the sort buffer includes:
phase sector determination circuitry coupled to the sine input and to the cosine input and determining a phase sector location for a pair of sine and cosine sample values;

phase sector update circuitry coupled to the flag locations and determining whether a phase sector location has a stored sine and cosine sample pair, and storing sine and cosine sample pair values a phase sector location.

9. The system of claim 1, in which the position detector outputs provide one of an optical signal, a magnetic signal, or a mechanical signal.

10. The system of claim 1, in which the position detector outputs provide include a first signal that is a sine wave, a second signal that is a cosine wave, and a third signal that is a reference output.

11. The system of claim 1, in which the processor is configured to determine position information and the position information is at least one of angular position or linear position.

12. The system of claim 1, in which the position detector includes at least one of an encoder or a resolver.

13. The system of claim 1, in which the motor is an electric motor.

14. The system of claim 13, in which the electric motor is one of a brushed direct current (DC) motor, a brushless DC motor, a switched reluctance motor, an induction motor, and a servomotor.

15. The system of claim 1, in which the system is an electric motor system.

16. A process comprising:
receiving pairs of sample sine values and sample cosine values from a sensor coupled to an electric motor;
storing first pairs of sample sine values and sample cosine values in different phase sector locations of a sort buffer;
determining a first offset and gain correction value from the first pairs of sample sine values and sample cosine values in the sort buffer after all the phase sector locations contain first pairs of sample sine values and sample cosine values;
clearing the sort buffer of the pairs of sample sine values and sample cosine values after the determining a first offset and gain error correction value;
storing second pairs of sample sine values and sample cosine values in different phase sector locations of the sort buffer after the clearing;
determining a second offset and gain correction value from the second pairs of sample sine values and sample cosine values in the sort buffer after all the phase sector locations contain second pairs of sample sine values and sample cosine values; and
updating the first offset and gain correction value with the second offset and gain correction value.

17. The process of claim 16 in which the storing first pairs of sample sine values and cosine values includes setting flags in the phase sector locations.

18. The process of claim 17 in which the clearing the sort buffer includes clearing the flags in the phase sector locations.

19. The process of claim 16 in which the storing first pairs and the storing second pairs includes storing the pairs in phase sector locations of a 360 degree phase.

20. The process of claim 16 in which the storing first and the storing second pairs includes storing the pairs in phase sector locations of equal phase size.

* * * * *